United States Patent [19]

Seay

[11] 4,281,754
[45] Aug. 4, 1981

[54] SILO UNLOADING CHUTE
[75] Inventor: Nicholas J. Seay, Madison, Wis.
[73] Assignee: Midwest Silo Company, Boscobel, Wis.
[21] Appl. No.: 119,802
[22] Filed: Feb. 8, 1980
[51] Int. Cl.³ .............................................. B65G 11/02
[52] U.S. Cl. ..................................................... 193/34
[58] Field of Search ....................... 193/34, 33, 25, 30, 193/29; 406/99; 52/195, 196

[56] References Cited

U.S. PATENT DOCUMENTS

| | | | |
|---|---|---|---|
| 1,071,535 | 8/1913 | Townshend | 193/34 X |
| 3,655,245 | 4/1972 | Schumacher | 406/99 |
| 3,797,625 | 3/1974 | Price | 193/34 |
| 3,931,877 | 1/1976 | Albaugh | 193/34 X |
| 3,961,693 | 6/1976 | Bruecker | 193/34 X |
| 4,062,434 | 12/1977 | Price et al. | 193/34 |

*Primary Examiner*—Robert B. Reeves
*Assistant Examiner*—Gene A. Church
*Attorney, Agent, or Firm*—Isaksen, Lathrop, Esch, Hart & Clark

[57] ABSTRACT

A silo unloading chute is disclosed which is installed in a silo (10) so that silage may be unloaded through an access chute (22) provided for human access to the silo (10) without fouling the access chute (22) itself. Adjacent to each of the doors (16) in the silo (10), a hoop (34) is positioned, and an elongated flexible tube member (38) is suspended from each hoop (34) extending so as to hang into the hoop (34) next therebeneath. Thus, silage introduced into a one of the hoops (34) enters the tube member (38) hanging therefrom and falls successively through each successive tube member (38) therebeneath.

9 Claims, 2 Drawing Figures

SILO UNLOADING CHUTE

BACKGROUND OF THE INVENTION

The present invention relates to silos in general, and, in particular, to unloading chutes designed to fit within the access chute of a silo so that silage may be unloaded from the silo down through the unloading chute without fouling the access chute.

DESCRIPTION OF THE PRIOR ART

The prior art is generally cognizant of the use of silage unloading chutes in a silo to prevent fouling of the access chute used to get access to the silo itself. Thus, examples are known in the prior art, such as in U.S. Pat. Nos. 3,709,345, 3,797,625 and 4,166,524, of such silo unloading chutes. It was also previously known in the art, as exemplified by U.S. Pat. Nos. 3,655,245 and 3,699,732, that silo unloading chutes could be made of flexible material. Silo unloading chutes of the type exemplified by these two patents were intended to be disposable, however, are not intended to be suitable for permanent installations as is the silo unloading chute of the present invention. Other silo unloading chutes are shown in U.S. Pat. Nos. 1,217,743, 3,931,877 and 3,961,693. It has also been known in the prior art that in forming silo unloaders, grain spouts, and other similar discharge structures, that it is possible to have a series of rigid members open at each end which are arranged in a series so as to open one into the other. Examples of such devices are shown in U.S. Pat. Nos. 1,127,324, 1,163,508, 2,772,764, 2,997,150, 3,428,156, and 3,807,540. At least one example is known of an apparatus, to be utilized as a rescue apparatus for rescuing persons, in which a series of somewhat flexible tubular devices are arranged so that each will open into the member next therebeneath. This apparatus is disclosed in U.S. Pat. No. 3,977,495.

SUMMARY OF THE PRESENT INVENTION

The present invention is summarized in that in a silo having provided therein a vertically aligned series of doors and having a access chute secured thereto providing access to the doors, the silo unloading chute includes a plurality of vertically spaced and aligned hoops positioned in the access chute, each of the hoops being associated with a one of the doors in the silo; a transfer funnel shaped so as to fit within a one of the doors in the silo at one end thereof and so as to extend into the hoop associated with said door at the other end thereof; and a flexible tube member suspended from each of the hoops, each of the tube members being of sufficient length so as to extend through the hoop next below the hoop from which the tube member is suspended and also being of sufficient size and shape so as to tend to fill said hoop next below to inhibit dust leakage therethrough.

It is an object of the present invention to provide a permanent silo unloading chute within the access chute of a silo which may be efficiently used to unload silage from a silo.

It is another object of the present invention to provide such a silo unloading chute which is economical and efficient in its installation and operation and is also economical to manufacture and install.

It is yet another object of the present invention to provide such a silo unloading chute which includes therein a minimum of moving parts but which is also inherently dust-free and not readily susceptible to leakage.

Other objects, advantages, and features of the present invention will become apparent from the following specification when taken in conjunction with the accompanying drawings.

DESCRIPTION OF THE PREFERRED EMBODIMENT

Figure 1:
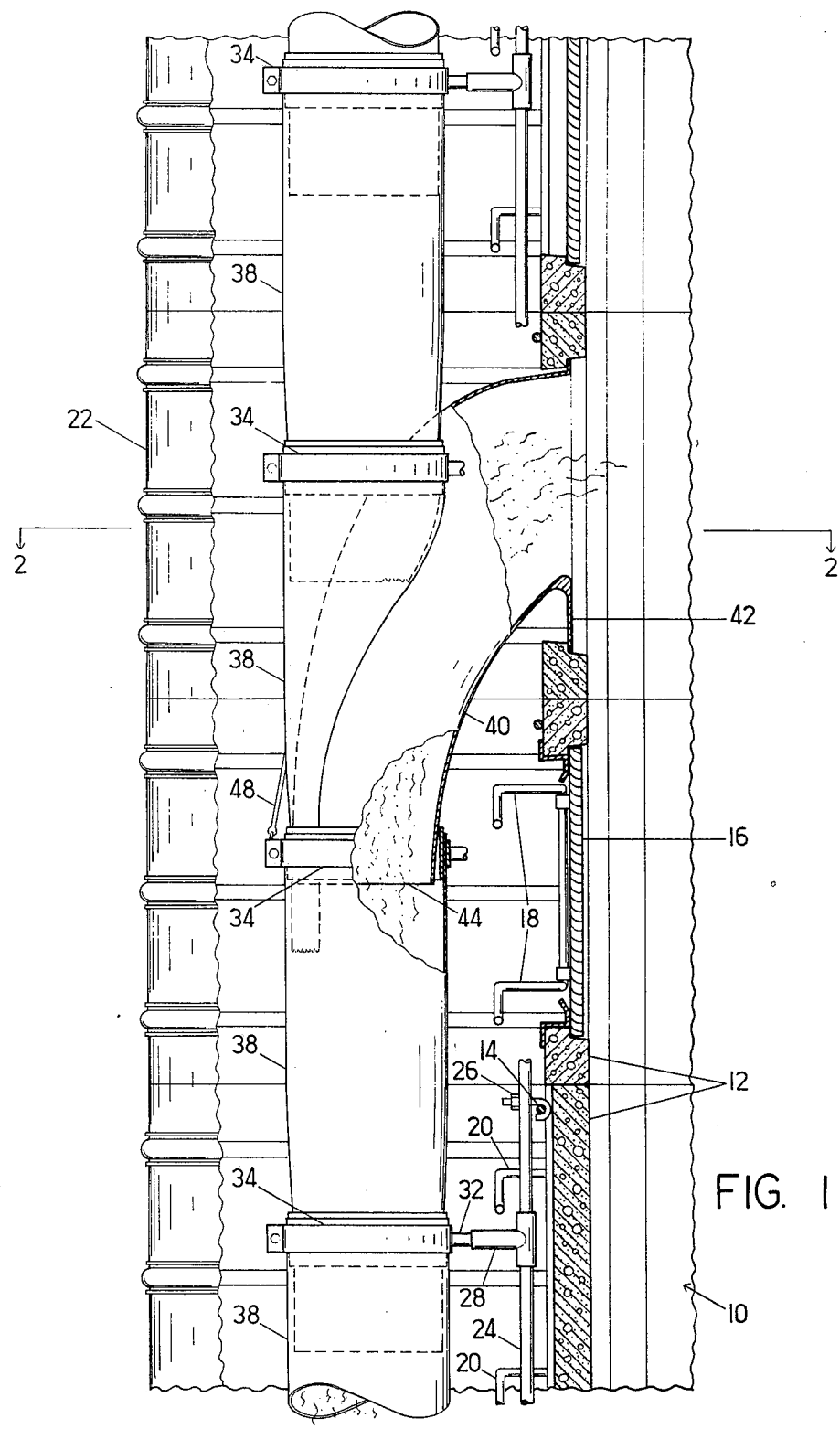
FIG. 1 is a cross-sectional view, partly broken away, of a side elevation of a silo including therein a silo unloding chute constructed in accordance with the present invention.

Shown in FIG. 1 is a partial sectional view of a silo installation including therein a silo unloading chute constructed in accordance with the present invention. The silo, which is generally indicated at 10, is in most respects a conventional silo and is an upright, cylindrical structure formed from a series of vertically stacked rows of silo stays 12 which are bound together by tension members 14 each of which extends around the circumference of one row of silo stays 12. Formed along one section of the wall of the silo 10 is a series of vertically aligned and regularly spaced doors 16. Each of the doors 16 is mounted upon a pair of door hinges 18, which are conventional in the art, and which serve both as ladder rungs for a person climbing up the exterior of the silo 10 and also as hinges for the doors 16 to open into the interior of the silo 10. Additional fixed rungs 20 may be provided in any of each of the silo staves 12 which are located between a pair of the vertically aligned doors 16. It is to be understood that as many of the doors 16 as may be desired for a particular application may be provided in the silo 10. The top of the open end of the silo 10 is closed by a dome of hemispherical shape (not shown). An access chute 22, of generally semi-circular cross-section, is positioned on the exterior of the silo 10 so as to extend over the vertically aligned doors 16 so that a person climbing up the door hinges 18 and the rungs 20 to obtain access to the doors 16 would be shielded from the weather by the access chute 22. The access chute 22 may be closed at its upper end (not shown) and may require suitable venting at the top thereof.

The silo unloading chute constructed in accordance with the present invention is intended to be installed inside of the access chute 22 located on the silo 10. Mounted adjacent to the exterior of the silo 10 and also adjacent to, but not in front of, the vertically aligned doors 16, is a vertical support member 24. The vertical support member 24 is a vertically positioned linear rod of rigid material, such as metal pipe, which is secured in place by periodically spaced fasteners 26 which are fastened at their other end to the tension members 14 of the silo 10. Periodically secured to the vertical support member 24 are a plurality of hoop brackets 28. The hoop brackets 28 are T-shaped members each positioned on the vertical support member 24 just beneath a respective one of the doors 16. The short leg of the T of each of the hoop brackets 28 is received over the vertical support member 24 and is secured in place to the vertical support member 24 by a set screw 30 or other fixing structure. The longer leg of the T of each of the hoop brackets 24 is hollow and sized so as to be adapted to receive therein a mounting shaft 32 attached to a hoop 34. The mounting shaft 32 of the hoop 34 is received within the short leg of the T of the hoop bracket 28 and is secured in place thereto by another set screw 36 or similar fixing device. Each of the hoops 34 is a circular member of rigid material, such as iron bar, to which the mounting shaft 32 is secured, as by welding. The hoops 34 are vertically aligned and each of the hoops 34 is positioned just below and to one side of the associated one of the doors 16 in the silo 10 as may be seen by referring to FIGS. 1 and 2. Attached to each of the hoops 34 and suspended hanging downwardly therefrom, is a respective tube member 38. Each of the tube members 38 is an elongated flexible tubular member of thin, flexible thermoplastic material. The tube members 38 may be of any desired cross-sectional shape, but are preferably sized and shaped so as to have a cross-sectional circular size similar to the hoops 34 for reasons that will become apparent herebelow. Each of the tube members 38 is secured at its upper end to its respective hoop 34 and hangs downwardly therefrom to be received within the next hoop 34 located next beneath the hoop 34 from which it is suspended. Each of the tube members 38 is of sufficient length so that it extends downwardly through the next hoop member 34 next beneath the hoop 34 from which it is suspended so that the bottom of the tube member 38 hangs into the hoop 34 next therebelow and into the next tube member 38 located next beneath it. The tube members 38 are preferably formed of thermoplastic material having a "memory" or a tendency to billow outwards so as to tend to fill the hoop 34 next below through which it hangs.

Figure 2:
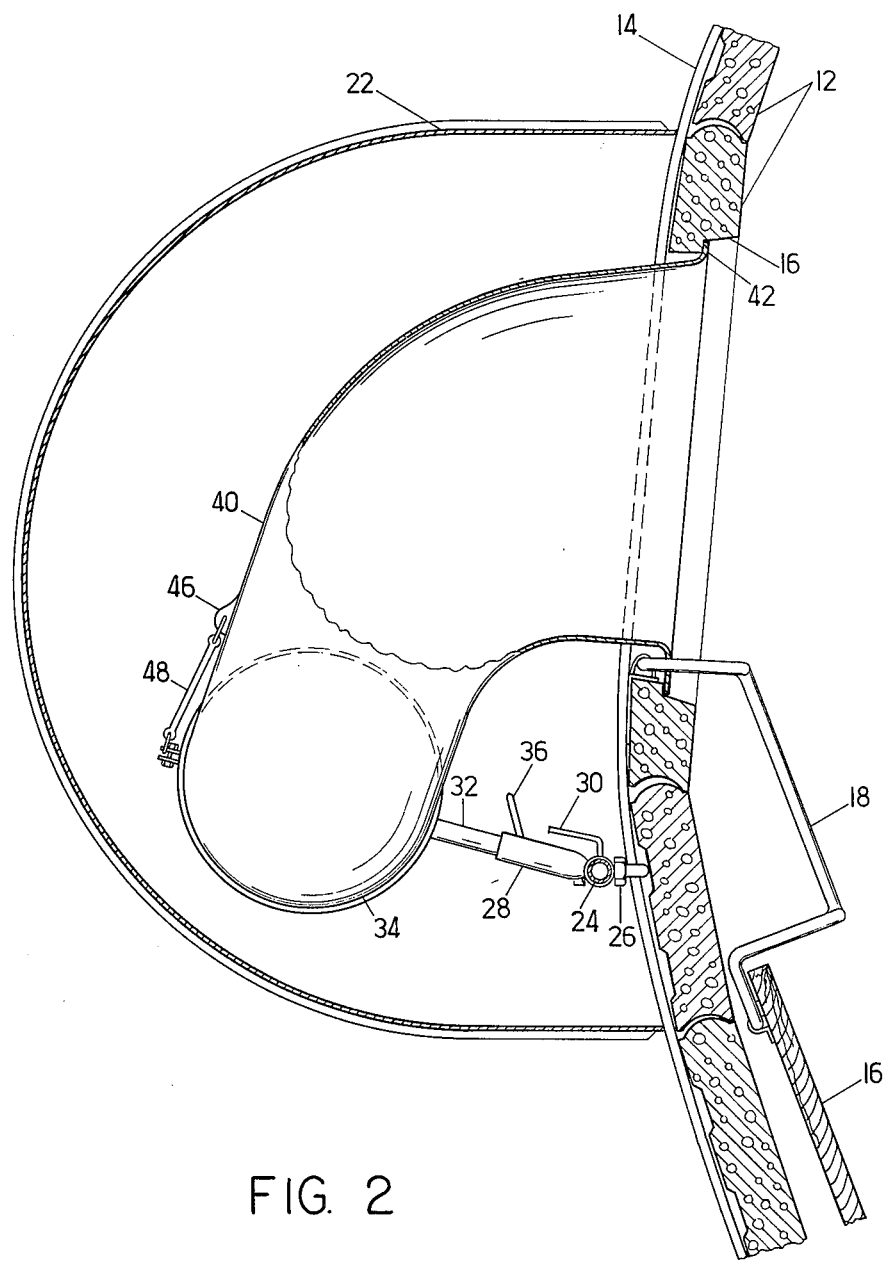
FIG. 2 is a cross-sectional view taken along the line 2—2 of FIG. 1.

A transfer funnel 40 is provided so as to extend between any one of the doors 16 and the associated hoop 34. At one end, the transfer funnel 40 is provided with a fitting 42 sized and shaped so as to be adapted to inner fit into the opening formed by the doors 16 when it is pivoted inward into the interior of the silo 10 as can be seen in FIG. 2. At its other end, the transfer funnel 40 is provided with an open end 44 sized and shaped so as to fit snugly within an appropriate one of the hoops 34. In between the door fitting 42 and the open end 44, the transfer funnel 40 is a closed tubular member having an appropriate downwardly inclined shape curved at an angle so as to be an efficient and dust-tight transfer conduit between the door opening 16 and a one of the hoops 34. The right angle bend in the transfer funnel 40 is required because of the fact that the hoops 34 are located to one side of the doors 16 as can be seen by referring to FIG. 2. On the exterior of the transfer funnel 40 a tie-down attachment 46 is provided to which a tie-down strap 48 may be secured with the other end of the tie-down strap 48 being securable to the hoop 34 so as to firmly hold the open end 44 of the transfer funnel 40 inside of the hoop 34.

In its operation, the silo unloading chute constructed in accordance with the present invention is adapted to facilitate the unloading of silage from a silo without fouling or otherwise contaminating the access chute of the silo. When it is desired for silage to be removed from the silo, a silo unloader of conventional design is placed within the silo, usually by lowering the silo unloader from the ceiling of the silo where it has been kept for storage. An appropriate door 16 is selected, one slightly above the level of silage in the silo, for removal of the silage, and that door 16 is opened. The transfer funnel 40 is then inserted from the interior of the silo 10 through the door opening 16 and the open end 44 of the transfer funnel 40 is inserted into the hoop 34 associated with the door 16 that has been opened. The door fitting 42 of the transfer funnel 40 is placed firmly inside of the opening of the door 16 and the tie-down strap 48 may be used to secure the open end 44 of the transfer funnel inside of the appropriate one of the hoops 34. As the open end 44 of the transfer funnel 40 is inserted into the hoop 34, the tube member 38 which hangs into that hoop 34 from the next hoop 34 thereabove, is pushed aside and pressed against one side of the hoop 34 as shown in FIG. 1. Silage may then be ejected by the silo unloader into the transfer funnel 40 through the door opening 16. Silage entering the transfer funnel 40 is conducted downwardly through the hoop 34 through which the open end 44 of the transfer funnel 40 extends into the tube member 38 depending from the hoop 34. Silage falling into the tube member 38 falls downwardly therethrough into the next tube member 38 located therebeneath and successively downward toward the bottom of the silo 10. The silage thus falls downwardly through successive ones of the tube members 38 to the bottom of the silo at which point it may be directed to the place or receptacle into which it is desired that the silage be delivered.

Since each of the tube members 38 is formed of a flexible resilient material, the tube members 38 need not be removed from the hoops 34 through which they hang when the open end 44 of the transfer funnel 40 is inserted into that hoop 34. When the transfer funnel 40 is inserted into such a hoop 34, the tube member 38 hanging down from above into that hoop is merely pressed to one side of the hoop 34 out of the path of the silage conducted through the transfer funnel 40. This feature means that the silo operator only needs to handle the transfer funnel 40 itself and does not need to operate any doors, hinges or other mechanical structures in the silage chute itself. When the transfer funnel 40 is removed from that hoop 34, the tube member 38 would then resiliently bellow outward to again fill the hoop 34. This bellowing of the tube member 38 outward to fill the hoop 34 through which it hangs functions to keep dust from escaping from the silo unloading chute formed by the successive tube members 38. This action is further reinforced by the force of the silage falling through the tube members 38 which tends to cause them to flex outwardly thus sealing even more tightly against each of the successive ones of the hoops 34 through which they pass. In this manner, an economical and efficient silo unloading chute is formed which is easily operated by the silo operator and which operates in an inherently dust-free manner. Furthermore, the need for doors of any kind in the silage chute is avoided with the result that problems of door operation and maintenance are avoided and the silo operator spends less time in the access chute 22 handling the silage chute itself than in prior art devices.

It is to be understood that it may not be desirable in all applications to provide one of the hoops 34 and the associated tube member 38 for each of the doors 16 provided in a particular silo 10. As many of the hoops 34 as may be desired may be provided for a particular application, it only being necessary that the tube member 38 depending from each of the hoops 34 be of sufficient length to fall inside of the hoop 34 next therebeneath. Each of the hoops 34 may be of any particular desired cross-sectional size or shape as long as the associated tube members 38 provided therewith are of similar size and shape so that they are capable of bellowing outward to fill the hoop member through which they depend.

The silo unloading chute constructed in accordance with the present invention is also particularly easy to install and maintain. In installing the silo unloading chute constructed in accordance with the present invention, it is first required that vertical support 24 be installed and this can be accomplished in any new or many preexisting silos. The continuously adjustable character of the hoop brackets 28 allows the hoops 34 to be positioned near the appropriate one of the doors 16 in any position as is desired for the particular application. All of the hoops 34 would be positioned in their desired locations relative to their appropriate doors 16 after which a one of the tube members 38 is hung from each of the hoops 34. Since the hoops 34 are of a durable character they should last indefinitely, while the tube members 38 may be easily and individually replaced from time to time as may be desired due to accident or age. In this manner, a permanent silo unloading chute is provided which is both economical in its original installation and economical to repair and maintain.

It is understood that the present invention is not limited to the particular construction and arrangement of parts disclosed and illustrated herein, but embraces all such modified forms thereof as come within the scope of the following claims.

I claim:

1. In a silo (10) having provided therein a vertically aligned series of doors (16) and having an access chute (22) secured thereto providing access to the doors (16), the silo unloading chute comprising:
   a plurality of vertically spaced and aligned hoops (34) positioned in the access chute (22), each of the hoops (34) being associated with a one of the doors (16) in the silo (10);
   a transfer funnel (40) shaped so as to fit within a one of the doors (16) in the silo (10) at one end thereof and so as to extend into the hoop (34) associated with said door (16) at the other end thereof; and
   a tube member (38) suspended from each of the hoops (34), each of the tube members (38) being of sufficient length so as to extend through the hoop (34) next below the hoop (34) from which the tube member (38) is suspended, of sufficient flexibility to permit the lower portion thereof to be pushed aside against one side of the hoop (34) next below when the transfer funnel (40) is inserted into the hoop (34) next below, and of sufficient resiliency to bellow outwardly to fill said hoop (34) next below to inhibit dust leakage therethrough when the transfer funnel (40) is removed therefrom.

2. In a silo, the silo unloading chute as claimed in claim 1 wherein each of the hoops (34) is circular in cross-section shape.

3. In a silo, the silo unloading chute as claimed in claim 3 wherein each of the tube members (38) is cylindrical in shape and sized so as to have a cross-sectional size similar to that of the hoops (34).

4. In a silo, the silo unloading chute as claimed in claim 1 wherein each of the flexible tube members (38) is formed of plastic material.

5. In a silo, the silo unloading chute as claimed in claim 1 wherein each of the hoops (34) is disposed so as to lie in a horizontal plane.

6. In a silo, the silo unloading chute as claimed in claim 1 wherein the transfer funnel (40) is provided at one end thereof with a door fitting (42) sized and shaped so as to fit within one of the door openings (16) in the silo (10).

7. In a silo, the silo unloading chute as claimed in claim 6 wherein the transfer funnel (40) is provided at its other end with an open end (44) sized so as to fit within and fill a one of the hoops (34).

8. A silo unloading chute for a silo (10) comprising:
   a plurality of circular hoops (34) adapted to be arranged in vertically aligned and spaced fixed relation; and
   a flexible elongated tube member (38) adapted to be suspended from each of the hoops (34), each tube member (38) having a circular cross-sectional shape similar in size to the hoops (34) and being of sufficient length to extend into and through the hoop (34) next beneath the hoop (34) from which the tube member (38) is suspended when the hoops are vertically aligned in space fixed relation, each tube member (38) also being of sufficient flexibility to permit the lower portion thereof to be pushed aside against one side of the hoop (34) next below through which it extends to permit access to the interior of the next lower tube member (38), and of sufficient resiliency to bellow outwardly to fill said hoop (34) next below and inhibit dust leakage therethrough when the tube member (38) is not being pushed aside for access to the interior of the said next lower tube (38).

9. The silo unloading chute as claimed in claim 8 wherein each of the flexible tube members (38) is formed of plastic material.

* * * * *